United States Patent Office 2,731,484
Patented Jan. 17, 1956

2,731,484
PREPARATION OF ORGANOTIN MERCAPTIDES

Chris E. Best, Franklin Township, Summit County, Ohio, assignor to The Firestone Tire & Rubber Company, Akron, Ohio, a corporation of Ohio No Drawing. Application June 27, 1950, Serial No. 170,692

6 Claims. (Cl. 260—429.7)

This invention relates to a novel method of preparing certain compounds which are di-organotin dimercaptides which compounds are useful, inter alia, as heat stabilizers in vinyl chloride polymers and copolymers.

SYNOPSIS OF THE INVENTION

The compounds prepared in accordance with this invention are embraced by the structural formula

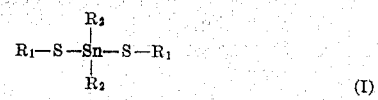

(I)

in which formula $R_1$, independently in each occurrence, represents an organic radical consisting of from 1 to 22 carbon atoms, hydrogen, carbon-carbon single bonds, carbon-hydrogen bonds (optionally) aromatic ring carbon-carbon double bonds, and (also optionally) a maximum total of four innocuous structures such as carbon-carbon triple bonds, aliphatic carbon-carbon double bonds, hydroxyl groups bonded to carbon, sulfhydryl groups bonded to carbon, ether linkages, thioether linkages, carboxylic ester groups bonded to carbon atoms, carboxylic amide groups bonded to carbon atoms, fluorine atoms bonded to carbon atoms, halogen atoms bonded to aromatic ring carbon atoms and groups of the formula

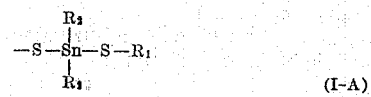

(I-A)

under the same notation, and $R_2$, independently in each occurrence, represents an organic radical consisting of from 1 to 22 carbon atoms, carbon, hydrogen, carbon-carbon single bonds, carbon-hydrogen bonds, (optionally) aromatic ring carbon-carbon double bonds and (also optionally) a maximum total of four innocuous structures such as carbon-carbon triple bonds, aliphatic carbon-carbon double bonds, ether linkages, thioether linkages, carboxylic ester groups bonded to carbon atoms, fluorine atoms bonded to carbon atoms, and halogen atoms bonded to aromatic ring carbon atoms.

In the above and all following formulae, the atoms in the groups $R_1$ and $R_2$ attached to the sulfur and tin atoms must always be carbon atoms.

The present invention consists in preparing these compounds by reacting mercaptans of the formula $$R_1—S—H \quad (II)$$

with stannones of the formula

(III)

all under the notation given in connection with Formula I above. Water is eliminated, with formation of the desired compounds (I).

Cross reference is made to the copending application of Stefl and Bentz, Ser. No. 170,691, filed June 27, 1950, relating to the di-organotin mercaptides per se; and to the copending application of Stefl and Best, Ser. No. 170,693, filed June 27, 1950, relating to the stabilization of vinyl chloride resins with the di-organotin dimercaptides.

THE SUBSTITUENTS $R_1$ AND $R_2$

The groups $R_1$ and $R_2$ in the formulae above may be substantially any organic substituents which (a) are not too large for convenient synthesis and reactivity and (b) do not contain any groups which will interfere with the synthesis or existence of the compounds. It will be understood, of course, that the atoms in the radicals $R_1$ and $R_2$ attached to the sulfur and tin atoms must be carbon atoms. In practice, a range of from 1 to 22 carbon atoms in each of the radicals $R_1$ and $R_2$ will cover the field of radicals which will be conveniently available and not too large to be readily reactable in the synthesis of the compounds of this invention. The radicals $R_1$ and $R_2$ may be, and from the standpoint of ready procurement and avoidance of complications in synthesis preferably are, simple monovalent hydrocarbon radicals containing only single bonds between the carbon atoms or aromatic ring double bonds between the carbon atoms (practically, there will be a maximum limit of 11 such double bonds in any radical), for instance alkyl, cycloalkyl, aryl, aralkyl, alkaryl and like monovalent hydrocarbon radicals containing from 1 to 22 carbon atoms. Likewise these radicals, in addition to simple hydrocarbon structure, may contain various other groupings which are sufficiently low in number, and of sufficiently non-reactive character, as not to interfere with the synthesis of the compounds of this invention. Structures which have been found innocuous and non-interfering in either of the radicals $R_1$ and $R_2$ are, inter alia, aliphatic ethylenic linkages (as distinguished from the unsaturated bonds in aromatic rings, which may be present in numbers limited only by the size of the radical $R_1$ or $R_2$ in question) acetylenic linkages, ether linkages, thioether linkages, carboxylic ester linkages, fluorine atoms bonded to carbon atoms and halogen atoms bonded to aromatic ring carbon atoms. The radical $R_1$, in addition to the above innocuous groups, will also tolerate other groups such as hydroxyl groups, sulfhydryl groups and carboxylic amide groups. Likewise, the radical $R_1$ may be linked through sulfur atoms to more than one organic substituted tin atom, in which case the radical $R_1$ of Formula I will contain a further group of the formula

(I-A)

in addition to the tin atom grouping of this character already shown in Formula I. It will be understood that $R_1$ in Formula I-A admits of expansion, so as to include polymeric materials of the type:

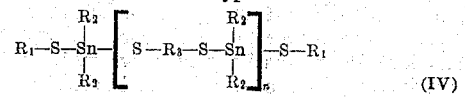

(IV)

wherein:

$R_3$ is a divalent organic radical satisfying the criteria of the radical $R_1$ as above defined, save in that $R_1$ is monovalent and $n$ is an integer from 1 to a practical (there would be no theoretical) limit of 10.

In general, it has been found that from 1 to 4 of the innocuous groups set forth above may be present in each of the radicals $R_1$ and $R_2$ in the formulae above.

Of all the radicals coming within the ambit of $R_1$ and $R_2$ as above defined, the simple hydrocarbon radicals containing not more than a combined total of four non-aromatic ethylenic linkages and acetylenic linkages will be preferred, as the starting materials for these compounds will be most readily accessible, and less complications will be encountered in the synthetic steps of this invention.

It is to be understood, of course, that the radicals $R_1$ and $R_2$ need not be, and in many cases are not, identical with each other but may be different radicals each individually coming under the definition of such radicals as given above; and that a preparation according to this invention need not be a pure compound, but may be a mixture of compounds each coming under the general Formula I above, such as would result, for instance, where starting materials were employed which would supply mixtures of radicals, for instance starting materials derived from natural sources or from petroleum fractions.

PREPARATION OF THE COMPOUNDS IN ACCORDANCE WITH THIS INVENTION

The reaction involved in the synthesis of the diorganotin dimercaptides in accordance with this invention is as follows.

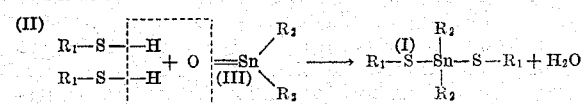

wherein the radicals $R_1$ and $R_2$ are as defined above in connection with Formula I above. It is to be understood that in many cases the two molecules indicated by the notation "$R_1$—SH" are identical mercaptan molecules, assuming that an unmixed pure mercaptan is supplied to the reaction; even if a mixture of mercaptans is supplied to the reaction, these will distribute themselves according to the reactivities involved, between reactive engagements in which the mercaptan molecules reacting with a given stannone molecule are identical, and those in which the two mercaptan molecules reacting with a single stannone molecule are different from each other. In accordance with the notation above, the radicals $R_1$ may themselves contain thiol groups, in which case a greater or less proportion of the mercaptan molecules (II) will react with two stannone molecules resulting in structures in accordance with Formula IV above. The reaction is readily and simply carried out by mixing the mercaptans II together with the stannone (III), and heating the mixture with stirring at temperatures in the range 40° C.–180° C. In most cases the mercaptans will not be volatile under these conditions and the reaction may be carried out in open vessels; however, some of the lower mercaptans may have appreciable, or even superatmospheric vapor pressures at these temperatures, in which case the reaction will be carried out in closed vessels with provision for reflux and, if necessary to confine the reactants, maintenance of superatmospheric pressure. The reaction is more readily controlled if not all the stannone compound is added at the outset, but rather is added in increments as the reaction proceeds. There will usually be employed a slight excess of the stannone, as these compounds are insoluble in the reaction products and may be separated therefrom at the conclusion of the reaction. The reaction goes substantially to completion in the course of an hour or so, when an excess of as little as one-tenth mole of the stannone is employed for each two moles of mercaptan. The reaction may be carried out in the absence of a solvent, since the mercaptan employed will usually be a liquid, or at least fusible at the temperature of reaction. Alternatively, a suitable non-reactive solvent may be employed, such as hydrocarbon solvents on the order of petroleum ether, benzene, toluene, xylene or the like, or chlorinated solvents such as carbon tetrachloride, trichloroethylene, tetrachloroethylene, hexachlorobutadiene, and the like. When a solvent is employed, it may be evaporated out of the reaction mass to entrain and remove the water resulting from the reaction. In some cases, it may be desirable from the standpoint of economics to use an excess of the mercaptan, removing this excess by a stripping operation if necessary.

As noted above the radicals $R_1$ and $R_2$ are not critical in nature and may be selected from a wide variety of substituents, examples of which are listed. The radicals $R_1$ are derived from the mercaptan or mercaptans supplied to the reaction, while the radicals $R_2$ are those attached to the tin atom in the stannone supplied to the reaction. Given herewith are a selected list of mercaptans and stannones conforming to the requirements of the radicals $R_1$ and $R_2$ given above. Any one of these or similar mercaptans may be reacted with any of these or similar stannones to yield compounds according to this invention.

Table I.—Mercaptans

Methyl mercaptan
Butyl mercaptan
Amyl mercaptan
n-Hexyl mercaptan
2-ethyl hexyl mercaptan
tt-Octyl mercaptan
Decyl mercaptan
Dodecyl mercaptan
Mixed mercaptans derived from fatty radicals of cocoanut oil or other natural fatty oils
Mercaptans from dimerized, trimerized and tetramerized isobutylene
Mercaptans containing the alkyl radicals of kerosene petroleum fractions
Tridecyl mercaptan
Oleyl mercaptan
Thioabietinol, or other mercaptans derived from the hydrocarbon residues of naval stores products, tall oil etc.
Mercaptans derived by conversion to mercaptans of the alcohols produced by the carbon monoxide-hydrogen synthesis, or of the mixed alcohols produced by the "oxo" process
Mercaptans produced by reduction of the alkyl sulfonic acids resulting from ultraviolet-sulfuryl chloride treatment of paraffins
2-mercaptoethanol
2(2-mercaptoethoxy)ethanol
2-ethyl hexyl thioglycolate
2-mercaptoethyl stearate
2-mercaptoethyl stearamide
Eicosyl mercaptan
Benzyl mercaptan
o-, m-, and p-Chlorobenzyl mercaptan
4,4'-diphenylether dithiol
2-(2-octyl phenoxy) ethoxy ethane, thiol, and other similar compounds in which the octyl group is replaced by other alkyl groups
Thiophenol
o-, m-, and p-Chlorothiophenol
Thio-p-cresol
α-Thionaphthol
β-Thionaphthol
Thiophene thiol
Mercaptobenzimidazole
Thiosalicylic acid
Thiocinnamic acid
2-mercapto methyl benzoate
p-Bromo thiophenol
p-(Trifluoromethyl) thiophenol Table II.—Stannones Dimethyl stannone
Diethyl stannone
Dibutyl stannone
Diisobutyl stannone
Di-n-hexyl stannone
Ethyl hexyl stannone
Dilauryl stannone
Stannones containing mixed alkyl groups derived from coconut oil
Di-hexadecyl stannone
Diphenyl stannone Di-α-naphthyl stannone
Phenyl ethyl stannone
Dithenyl stannone
Di(2-thienyl) stannone
Difuryl stannone
Difurfuryl stannone
Dixenyl stannone
Di(ethoxyethyl) stannone
Cyclopentamethylene stannone The compounds prepared in accordance with this invention are for the most part liquids at ordinary temperatures, although some of them may be solids. They are useful as intermediates in the production of other compounds, and find particular use as stabilizers in vinyl chloride resins.

With the foregoing general discussion in mind, there are given herewith detailed examples of the practice of this invention. All parts given are by weight.

EXAMPLE I

|  | Gram-mole |
|---|---|
| Mercaptan (per Table III) | .2 |
| Stannone (per Table III) | .11 |

A series of di-organotin dimercaptides was prepared by reacting together, in combinations set forth in Table III hereinbelow, .2 gram-mole portions of various mercaptans with .11 gram-mole portions (10% excess) of various stannones. In each case, the selected mercaptan was placed in an open beaker, and heated to about 120° C. (In those cases where the mercaptan was volatile, e. g. butyl mercaptan, the mercaptan was used in excess, the temperature was raised to the boiling point of the mercaptan, and the reaction carried out in a closed vessel under reflux with a water trap rather than an open beaker, the excess of the mercaptan being stripped at the end of the reaction.) The selected stannone was then added with continuous stirring, in small portions, as rapidly as the foaming would permit. During this reaction, the temperature was maintained between 120° and 150° C. by application of heat as needed. After all the stannone had been added, and foaming had subsided, the temperature was raised to 150° C., held at this figure for 15 minutes, and then reduced to 25° C. The cooled reaction mass was filtered to remove the unreacted stannone, and the filtrate taken as substantially pure di-organotin dimercaptide in which the organic groups directly attached to the tin were those originally present in the stannone, and the organic groups linked to the tin through the mercaptide sulfur atoms are those originally present in the mercaptans employed. Viscous products were diluted with benzene for the filtration.

The products were then tested as stabilizers in vinyl chloride resins as follows:

|  | Parts |
|---|---|
| Copolymers of 90% vinyl chloride, 10% vinylidene chloride | 100 |
| Di(2-ethylhexyl) phthalate | 35 |
| Tricalcium phosphate | 1.0 |
| Silicate pigment | 1.0 |
| Stabilizer compound under test | 2.0 |

*Table III*

| Starting Materials | | Properties of Product | | Heat-Stabilization Data Appearance of Specimen After Heating For— | | | | | Run No. |
|---|---|---|---|---|---|---|---|---|---|
| Stannone | Mercaptan | Melting Point (° C.) | Refractive Index, $n_D^{20}$ | 15 min. | 30 min. | 60 min. | 90 min. | 120 min. | |
| Dimethyl | butyl | | 1.5371 | white | pale straw | tan | light brown | light brown | 1 |
| | coconut [1] | | 1.4978 | do | white | white | pale straw | pale straw | 2 |
| | p-cresyl | 60–61 | | do | do | do | do | light brown | 3 |
| | 2-(methyl benzoate) | | 1.6468 | do | do | off-white | off-white | straw | 4 |
| | Sharples amyl [2] | | 1.5200 | do | pale straw | pale straw | tan | light brown | 5 |
| | coconut [1] | | 1.4968 | do | white | do | pale straw | straw | 6 |
| | t-dodecyl | | 1.5168 | do | off-white | do | tan | light brown | 7 |
| | Hooker tridecyl [3] | | 1.4982 | do | do | off-white | pale straw | straw | 8 |
| | hexadecyl | | 1.4975 | do | white | white | off-white | pale straw | 9 |
| | t-hexadecyl | | 1.5064 | do | off-white | faint straw | light tan | tan | 10 |
| | octadecyl | 26 | | do | white | white | white | pale straw | 11 |
| | Sharples 3-B [4] | | 1.5158 | do | off-white | pale straw | straw | brown | 12 |
| | Phillips B-8 [5] | | 1.5189 | off-white | do | light straw | tan | do | 13 |
| | Phillips MTM [6] | | 1.5169 | white | do | do | do | do | 14 |
| | Sharples 4B [7] | | 1.5145 | do | do | straw | straw | tan | 15 |
| | 2-mercaptoethanol | | 1.5663 | do | white | do | tan | brown | 16 |
| Dibutyl | benzyl | | 1.5989 | do | do | white | light straw | light brown | 17 |
| | R & H E-2-435 [8] | | 1.5360 | do | do | off-white | off-white | pale straw | 18 |
| | [10] | | 1.5429 | do | do | do | white | off-white | 19 |
| | phenyl | | 1.6105 | do | off-white | off-white | light straw | light tan | 20 |
| | p-cresyl | | 1.6029 | do | do | do | pale straw | straw | 21 |
| | α-naphthyl | | 1.6770 | do | do | pale straw | do | do | 22 |
| | β-naphthyl | | 1.6630 | do | white | off-white | do | do | 23 |
| | 4,4'-diphenylether dithiol | waxy solid | | do | do | do | do | pale straw | 24 |
| | thiophenethiol | | 1.6280 | faint rose | faint rose | faint reddish-white | brownish | brown | 25 |
| | chlorobenzyl | | 1.6031 | white | white | do | light straw | light brown | 26 |
| | thiosalicylic acid | tan resin | | do | off-white | straw | tan | brown | 27 |
| | thiocinnamic acid | red-brown resin | | pale straw | straw | tan | light brown | do | 28 |
| Di-coconut [1] | butyl | | 1.4967 | white | off-white | straw | do | light brown | 29 |
| | coconut [1] | | 1.4859 | do | do | off-white | pale straw | straw | 30 |
| | p-cresyl | | 1.5461 | do | do | do | pale straw | do | 31 |
| Diphenyl | butyl | | 1.5901 | do | white | off-white | do | do | 32 |
| | coconut [1] | | 1.5224 | do | off-white | pale straw | do | black edge | 33 |
| | [10] | | 1.5695 | off-white | do | off-white | off-white | pale straw | 34 |
| | p-cresyl | | 1.6835 | do | do | do | do | do | 35 |
| Dithienyl | coconut [1] | | [9] 1.5147 | do | do | pale straw | pale straw, black flecks | black | 36 |
| Blank run without stabilizer | | | | tan | dark tan | brown | dark brown | dark brown | 37 |

[1] Containing the mixed alkyl radicals, predominantly lauryl and myristyl, of the alcohols produced by reduction of the mixed fatty radicals of coconut oil.
[2] Mixed amyl alcohols marketed by Sharples Chemicals, Inc.
[3] Mercaptans derived from alcohols produced by the oxo process, and marketed by the Hooker Electrochemical Co.
[4] Addition product of hydrogen sulfide to triisobutylene. Manufactured by Sharples Chemicals, Inc.
[5] Addition product of hydrogen sulfide to mixed 8-carbon olefines. Manufactured by the Phillips Petroleum Co.
[6] Addition product of mixed 8-, 12- and 14-carbon olefines with hydrogen sulfide. Manufactured by the Phillips Petroleum Co.
[7] Addition product of hydrogen sulfide to tetraisobutylene. Manufactured by Sharples Chemicals, Inc.
[8] An alkylated benzyl mercaptan, manufactured by the Rohm and Haas Co.
[9] This product is estimated to contain about 50% of compounds of this invention.
[10] Octyl phenoxy mercaptoethyl ether, as commercially designated. More accurately 2-(2-octyl-phenoxy) ethoxy ethane thiol.

A series of compositions was made up in accordance with the foregoing schedule, using as the stabilizer each of the di-organotin dimercaptides prepared as above described and tabulated in Table III. In each case the listed ingredients, together with the compound under test, in the proportions indicated in the schedule, were thoroughly mixed together and placed on a laboratory roll mill at 320° F. Milling was continued for two minutes, at which time the gauge was set at .025 inch and the sheet removed from the mill and cooled.

Five one-inch square specimens of each of the sheets of each of the compositions prepared as above described were hung vertically in a forced-draft oven maintained at 170° C. Specimens of each of the compositions were removed after intervals of 15, 30, 60, 90 and 120 minutes of exposure in the oven, and were rated subjectively as to color and extent of deterioration by the operator, which ratings are set forth herewith in Table III opposite the tabulation of the preparation of the compounds of this invention.

It will be understood that in many of the above cases, the products are mixtures containing compounds within the ambit of Formula I above, so that the properties given are applicable only to the preparation in question. In all cases, however, it is estimated that the products contain at least 90% of compounds which are di-organotin dimercaptides of the general Formula I, except as indicated by note 9.

EXAMPLE II

DIBUTYLTIN DILAURYL MERCAPTIDE LARGE SCALE PREPARATION

| | Parts |
|---|---|
| Commercial dodecyl mercaptan (containing the mixed fatty chains of coconut oil) | 3000 |
| Dibutyl stannone (dibutyltin oxide) | 1750 |

In this preparation there was employed a closed reaction vessel provided with a heating jacket, an overhead lock for the introduction of powdered reactants, a mechanical stirrer, and a vapor offtake leading from the top of the vessel to a condenser.

The dodecyl mercaptan was charged to the vessel and heated to 145° C. Stirring was commenced, and continued throughout the remainder of the process. The dibutyltin oxide was added portionwise through the lock, and dissolved in the reaction mass with evolution of water, which was condensed and recovered in the condenser. Toward the latter part of the addition of the dibutyltin oxide, the reaction mass showed some tendency to foam, which was overcome by raising the temperature to 170° C. The last portions of dibutyltin oxide caused the reaction mass to cloud, and heating and stirring at 170° C. were continued for an additional fifteen minutes. The reaction mass was then cooled to 25° C., filtered, agitated with decolorizing charcoal, and refiltered. There was obtained 4370 parts of a product having a refractive index $n_D^{20}$ 1.4968.

The water recovered from the condenser was weighed, and amounted to 95% of the theoretical amount of water, assuming that one mole of water was evolved for each two moles of mercaptan employed.

The product was subjected to short-path molecular distillation at a pressure of 10 microns. The principal fraction came over at 160° C., and had a refractive index $n_D^{20}$ 1.5011 and contained 18.67% of tin by analysis. The theoretical tin content of the compound $$(C_4H_9)_2Sn(SC_{12}H_{25})_2$$

is 18.13%.

EXAMPLE III

VARIOUS COMMERCIAL RESINS

| | Parts |
|---|---|
| Vinyl chloride resin (various commercial resins per Table IV) | 100 |
| Di-organotin dimercaptide (per Table IV) | 0 or 2 |
| Di(2-ethylhexyl) phthalate | 46 |
| Tricalcium phosphate | 1 |
| Silicate pigment | 1 |

A series of compounds was made up in accordance with the foregoing schedule, using various commercial

Table IV

| Vinyl Chloride Resin Used | Stabilizer Used | | Heat Stabilization Data Appearance of Specimen After Heating For— | | | | | Item No. |
|---|---|---|---|---|---|---|---|---|
| | Name | Parts Used | 15 Min. | 30 Min. | 60 Min. | 90 Min. | 120 Min. | |
| Geon 101 (homopolymer of vinyl chloride; manufactured by the B. F. Goodrich Co.). | None | 0 | light tan | dark tan | brown | dark brown | dark brown | 1 |
| | Dimethyltin Dicoconut Mercaptide.[1] | 2 | white | white | off-white | pale straw | dark straw | 2 |
| | Dibutyltin Mercaptide [1] of Coconut Mercaptans. | 2 | do | do | do | do | straw | 3 |
| Pliovic (copolymer of 90% vinyl chloride, 10% diethyl maleate; manufactured by the Goodyear Tire and Rubber Co.). | None | 0 | pale straw | light tan | brown | dark brown | dark brown | 4 |
| | Dimethyltin Dicoconut Mercaptide.[1] | 2 | white | white | pale straw | light brown | light brown | 5 |
| | Dibutyltin Dicoconut Mercaptide.[1] | 2 | off-white | off-white | do | do | do | 6 |
| Vinylite VYNW (copolymer of 96% vinyl chloride, 4% vinyl acetate; manufactured by Carbide and Carbon Chemicals Corp.). | None | 0 | beige | brown | brown | dark brown | dark brown | 7 |
| | Dimethyltin Dicoconut Mercaptide.[1] | 2 | white | off-white | pale straw | pale straw | light straw | 8 |
| | Dibutyltin Dicoconut Mercaptide.[1] | 2 | do | do | do | do | pale straw | 9 |

[1] The alkyl groups linked through sulfur to tin in these mercaptides are the mixed alkyl groups present in mercaptans produced by conversion to mercaptans of the alcohols obtained by reduction of coconut oil fatty acids.

resins with various di-organotin dimercaptides, in combinations set forth in Table IV hereinabove. Each compound was then compounded and tested as described in Example I. Following are the results of the test.

From the foregoing general description and detailed specific examples, it will be evident that this invention provides a convenient and economical method for the preparation of di-organotin dimercaptides. The process makes use of the readily available di-organo stannones and mercaptans, and involves a mere heating together of the starting materials without necessity for provision against corrosive by-products or reactants. Purification of the products sufficient for technical purposes is readily effected by the use of slight excesses of stannone, and removal thereof by simple filtration.

What is claimed is:

1. Process which comprises reacting together a mercaptan of the formula $$R_1\text{—S—H}$$

with a stannone of the formula $$R_1\text{—}\underset{\underset{\displaystyle R_1}{\|}}{\overset{\displaystyle O}{Sn}}\text{—}R_1$$

in which formulae $R_1$, independently in each occurrence represents an organic radical consisting of and containing from 1 to 22 carbon atoms, hydrogen, carbon-carbon single bonds, carbon-hydrogen bonds, up to 11 aromatic ring carbon-carbon double bonds, and up to 4 innocuous structures selected from the group consisting of carbon-carbon triple bonds, aliphatic carbon-carbon double bonds, hydroxyl groups bonded to carbon, sulfhydryl groups bonded to carbon, ether linkages, thioether linkages, carboxylic ester groups bonded to carbon atoms, carboxylic amide groups bonded to carbon atoms, fluorine atoms bonded to carbon atoms and halogen atoms bonded to aromatic ring carbon atoms, and $R_2$, independently in each occurrence, represents an organic radical consisting of and containing from 1 to 22 carbon atoms, hydrogen, carbon-carbon single bonds, carbon hydrogen bonds, up to 11 aromatic ring carbon-carbon double bonds, and up to 4 innocuous structures selected from the group consisting of carbon-carbon triple bonds, aliphatic carbon-carbon double bonds, ether linkages, thioether linkages, carboxylic ester groups bonded to carbon atoms, fluorine atoms bonded to carbon atoms and halogen atoms bonded to aromatic ring carbon atoms, the atoms in the groups $R_1$ and $R_2$ attached to the sulfur and tin atoms being carbon atoms.

2. Process which comprises reacting dimethyl stannone with the mercaptans containing the mixed alkyl radicals of the alcohols produced by the reduction of the mixed fatty radicals of cocoanut oil.

3. Process which comprises reacting dibutyl stannone with the mercaptans containing the mixed alkyl radicals of the alcohols produced by reduction of the mixed fatty radicals of cocoanut oil.

4. Process which comprises reacting diphenyl stannone with the mercaptans containing the mixed alkyl radicals of the alcohols produced by the reduction of the mixed fatty radicals of cocoanut oil.

5. Process which comprises reacting dibutyl stannone with 2-(2-octyl phenoxy) ethoxy ethane thiol.

6. Process which comprises reacting dibutyl stannone with thiophenol.

References Cited in the file of this patent

UNITED STATES PATENTS 2,489,518   Burt _____ Nov. 29, 1949

OTHER REFERENCES

Goddard: Text Book of Inorganic Chemistry, vol. XI, part I, pages 324–325 (1928).

Harada: The Inst. of Research of Physics and Chem., Tokyo, vol. 35 (1939), page 304.